United States Patent
Hau et al.

(10) Patent No.: US 7,415,337 B2
(45) Date of Patent: Aug. 19, 2008

(54) METHOD AND APPARATUS FOR DETECTING A PEDESTRIAN IMPACT

(75) Inventors: Lawrence C. Hau, Kokomo, IN (US); Kevin D. Kincaid, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 254 days.

(21) Appl. No.: 11/189,260

(22) Filed: Jul. 26, 2005

(65) Prior Publication Data

US 2007/0027584 A1 Feb. 1, 2007

(51) Int. Cl.
*G06F 17/00* (2006.01)

(52) U.S. Cl. .................. 701/45; 340/436; 180/274; 280/734; 280/735; 701/301

(58) Field of Classification Search .................. 701/45; 280/735; 180/274; 340/436
See application file for complete search history.

(56) References Cited

U.S. PATENT DOCUMENTS

| | | | |
|---|---|---|---|
| 5,576,684 A * | 11/1996 | Langford | 338/50 |
| 6,009,970 A | 1/2000 | Breed | |
| 6,015,163 A * | 1/2000 | Langford et al. | 280/735 |
| 6,212,456 B1 * | 4/2001 | Stride | 701/45 |
| 6,329,910 B1 * | 12/2001 | Farrington | 340/436 |
| 6,497,430 B1 * | 12/2002 | Odom et al. | 280/735 |
| 6,561,301 B1 * | 5/2003 | Hattori et al. | 180/274 |
| 6,744,354 B2 * | 6/2004 | Stephan et al. | 340/436 |
| 6,784,792 B2 * | 8/2004 | Mattes et al. | 340/436 |
| 7,036,621 B2 * | 5/2006 | Takafuji et al. | 180/274 |
| 7,143,856 B2 * | 12/2006 | Takahashi et al. | 180/274 |
| 2004/0007859 A1 | 1/2004 | Shields et al. | |
| 2004/0108157 A1 * | 6/2004 | Takafuji et al. | 180/274 |
| 2004/0182629 A1 * | 9/2004 | Takahashi et al. | 180/274 |
| 2004/0210367 A1 * | 10/2004 | Takafuji et al. | 701/45 |
| 2004/0238256 A1 * | 12/2004 | Henderson et al. | 180/274 |
| 2004/0258279 A1 * | 12/2004 | Hirvonen et al. | 382/104 |
| 2005/0021192 A1 * | 1/2005 | Takafuji et al. | 701/1 |
| 2005/0096815 A1 * | 5/2005 | Takafuji et al. | 701/45 |
| 2005/0098372 A1 * | 5/2005 | Takimoto | 180/274 |
| 2005/0099278 A1 * | 5/2005 | Kawaura et al. | 340/435 |
| 2005/0154530 A1 * | 7/2005 | Hosokawa et al. | 701/301 |
| 2005/0182540 A1 * | 8/2005 | Sugiura et al. | 701/41 |
| 2005/0242596 A1 * | 11/2005 | Zanella et al. | 293/4 |

(Continued)

FOREIGN PATENT DOCUMENTS

EP     1 426 252     6/2004

(Continued)

OTHER PUBLICATIONS

European Search Report dated Nov. 22, 2006.

*Primary Examiner*—Thomas G. Black
*Assistant Examiner*—Wae Louie
(74) *Attorney, Agent, or Firm*—Douglas D. Fekete

(57) ABSTRACT

The collision of a vehicle with a pedestrian is detected based on the response of bend sensor segments affixed to a vehicle body panel such as a bumper fascia. The sensor data is processed to identify the location of an object impacting the body panel, and is correlated with calibration data to determine the shape and mass of the object. Impacts with pedestrians are discriminated from impacts with other objects based on the determined shape and mass.

9 Claims, 5 Drawing Sheets

U.S. PATENT DOCUMENTS

| | | | |
|---|---|---|---|
| 2006/0196716 A1* | 9/2006 | Hawes et al. | 180/274 |
| 2006/0213714 A1* | 9/2006 | Igawa | 180/274 |
| 2007/0027584 A1* | 2/2007 | Hau et al. | 701/1 |
| 2007/0112513 A1* | 5/2007 | Mathevon et al. | 701/301 |

FOREIGN PATENT DOCUMENTS

| | | |
|---|---|---|
| WO | 01/24137 | 4/2001 |
| WO | 01/98117 | 12/2001 |

* cited by examiner

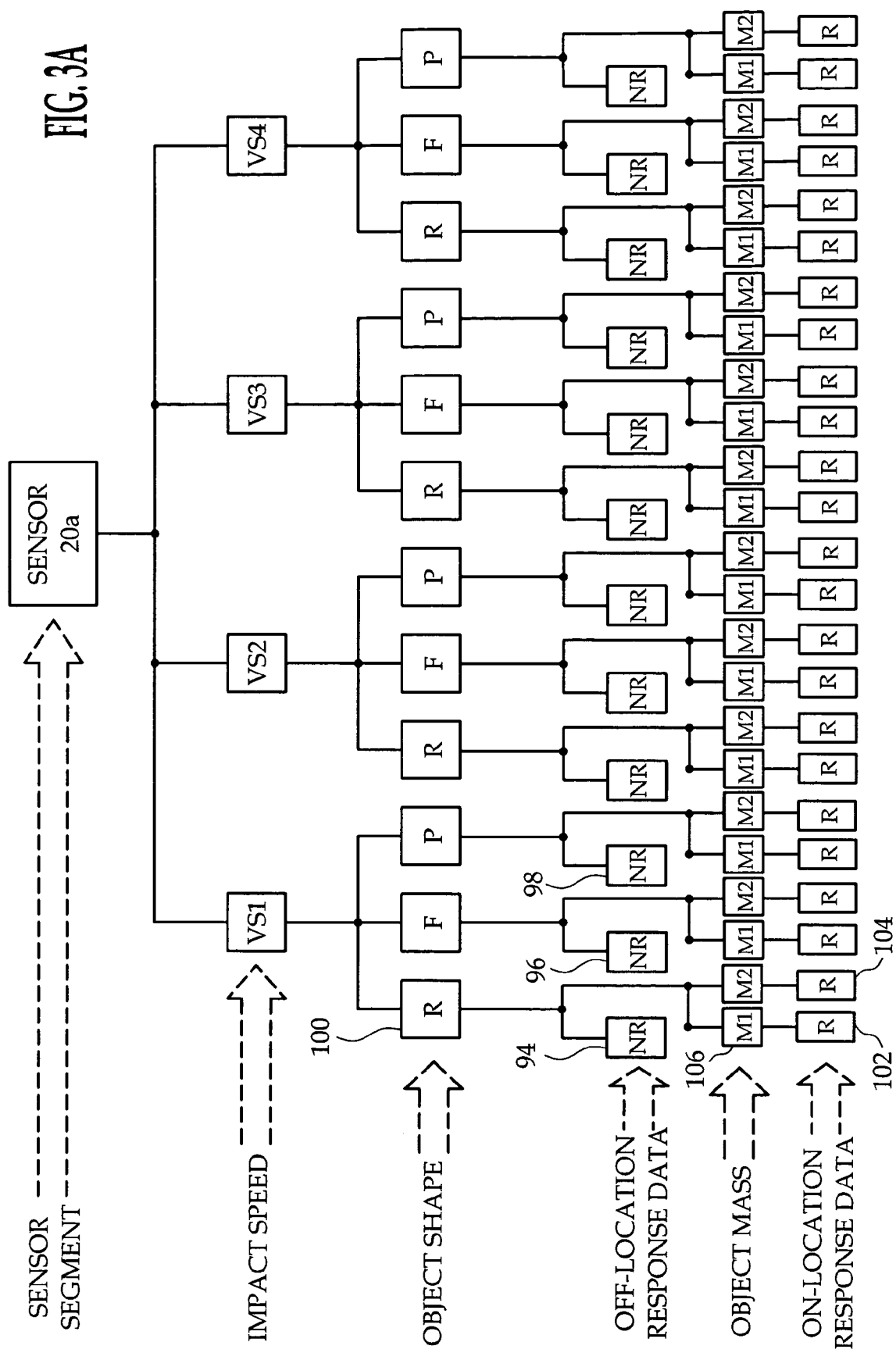

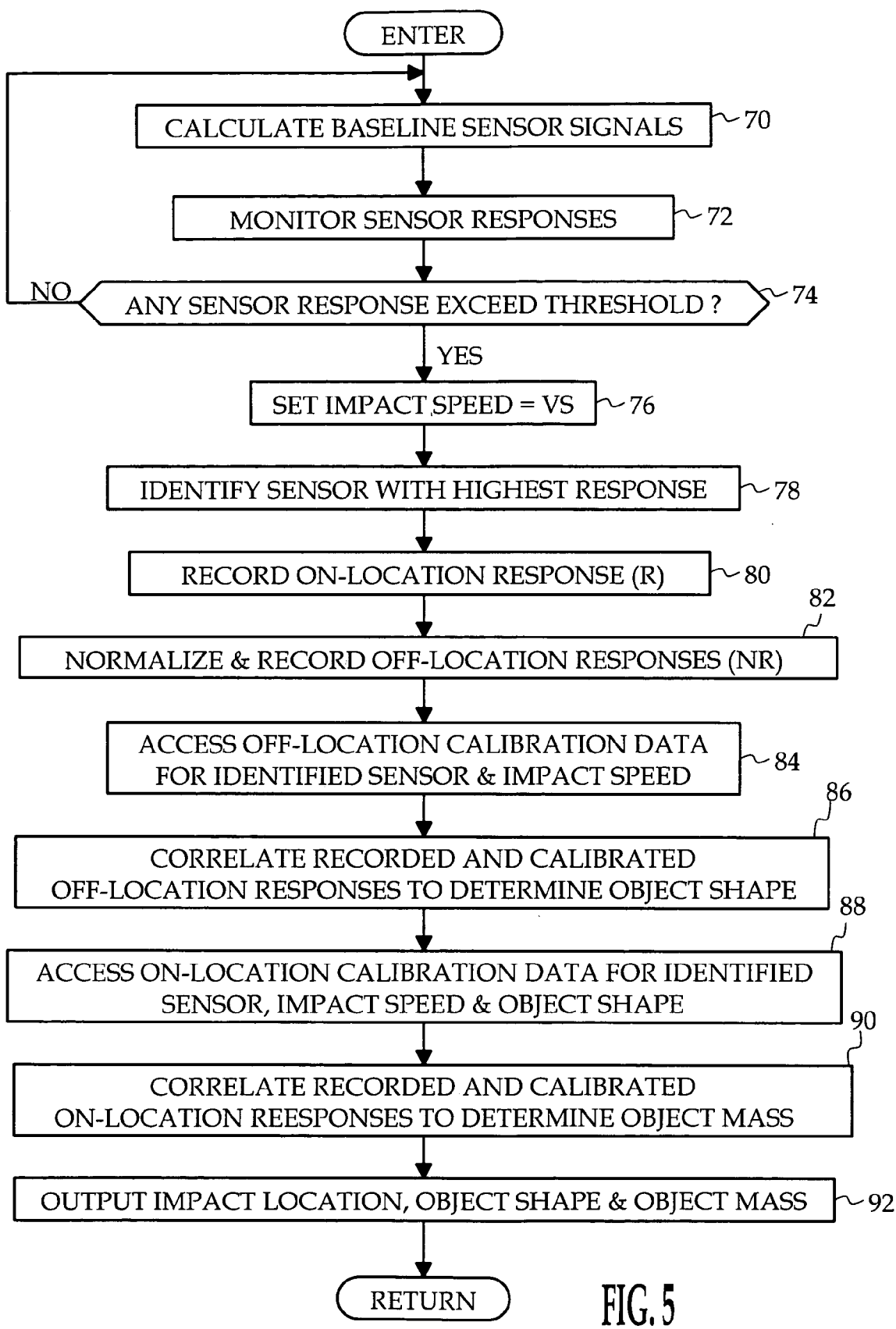

METHOD AND APPARATUS FOR DETECTING A PEDESTRIAN IMPACT

TECHNICAL FIELD

The present invention relates to pedestrian impact detection for a vehicle, and more particularly to a sensing method that provides timely and reliable detection of pedestrian impacts for which pedestrian safety devices should be deployed.

BACKGROUND OF THE INVENTION

A vehicle can be equipped with deployable safety devices designed to reduce injury to a pedestrian struck by the vehicle. For example, the vehicle may be equipped with one or more pedestrian air bags and/or a device for changing the inclination angle of the hood. Since these devices are only to be deployed in the event of a pedestrian impact, the deployment system must be capable of reliably distinguishing pedestrian impacts from impacts with other objects. However, equipping a production vehicle with the required sensors can be both costly and difficult. Accordingly, what is needed is a way of detecting pedestrian impacts that is more practical and cost-effective.

SUMMARY OF THE INVENTION

The present invention provides an improved method and apparatus for detecting pedestrian impacts with a vehicle. Bend sensor segments are affixed to a vehicle body panel such as a bumper fascia and are responsive to deflection of the body panel due to impacts. The sensor data is processed to identify the location of an object impacting the body panel, and is correlated with calibration data to determine the shape and mass of the object. Impacts with pedestrians are discriminated from impacts with other objects based on the determined shape and mass.

BRIEF DESCRIPTION OF THE DRAWINGS

FIG. 3A is a diagram depicting calibration data acquired by the ECU of FIG. 1 according to this invention;

FIG. 5 is a flow diagram representative of a software routine executed by the ECU of FIG. 1 for processing the bend sensor data to discriminate impact type.

DESCRIPTION OF THE PREFERRED EMBODIMENT

Figure 1:
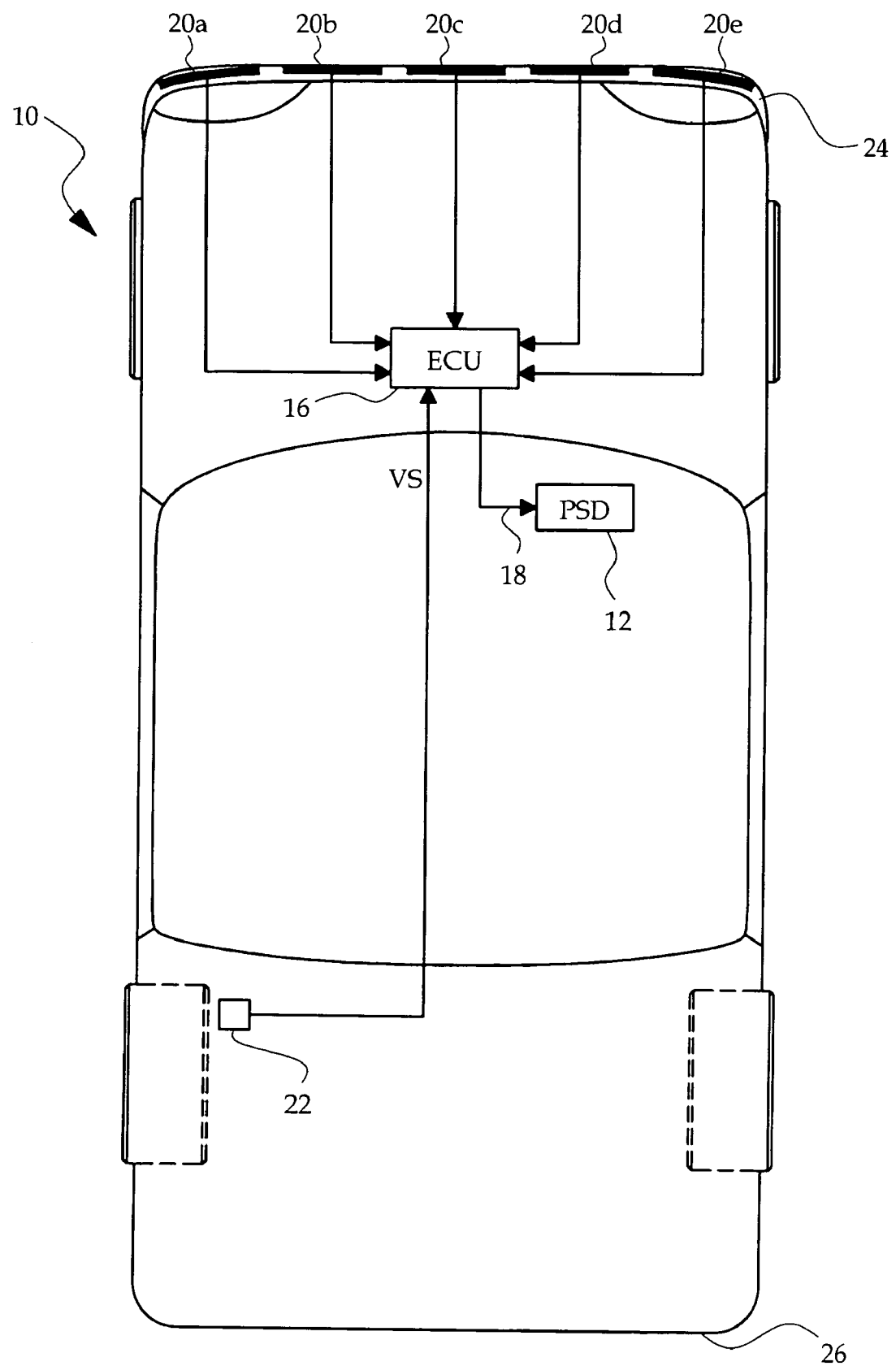
FIG. 1 is a diagram of a vehicle equipped with pedestrian safety devices, segmented bend sensors and a programmed microprocessor-based electronic control unit (ECU)

Referring to FIG. 1, the reference numeral 10 designates a vehicle that is equipped with one or more pedestrian safety devices and a sensing system for deploying the safety devices when a pedestrian impact is detected. The pedestrian safety devices (PSDs) are designated by a single block 12, and may include one or more pedestrian air bags and a mechanism for changing the inclination angle of the vehicle hood. The PSDs 12 are selectively activated by a microprocessor-based electronic control unit (ECU) 16, which issues a deployment command to PSD 12 on line 18 when a pedestrian impact is detected. The ECU 16 detects pedestrian impacts based on inputs from a number of sensors, including a set of bend sensors 20a, 20b, 20c, 20d, 20e and a vehicle speed sensor 22 (which may be responsive to wheel speed, for example). Bend sensors 20a-20e (also known as flex sensors) are deflectable strip devices having an electrical resistance that varies in relation to the amount of their deflection. Suitable bend sensors are available from Flexpoint Sensor Systems, Inc., for example. In the illustrated embodiment, bend sensors 20a-20e are mounted on the inner surface of the front bumper fascia 24 to detect frontal pedestrian impacts. A similar set of bend sensors could additionally be mounted on the rear bumper fascia 26 or any other body panel that deflects on impact.

Figure 2:
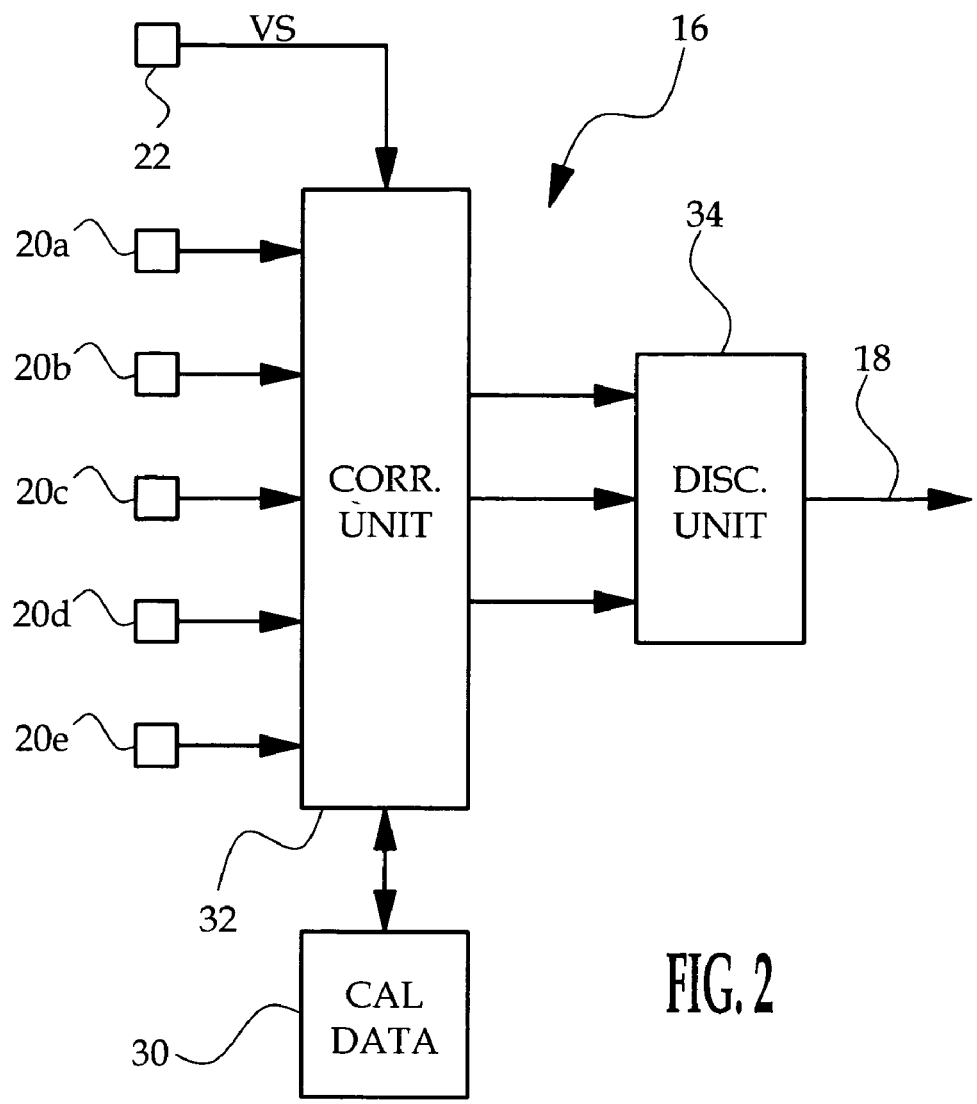
FIG. 2 is a block diagram depicting the functionality of the ECU of FIG. 1.

The block diagram of FIG. 2 illustrates functional elements of the ECU 16, including an archival memory 30 for storing calibration data, a correlation unit 32 and a discrimination unit 34. The calibration data stored in memory block 30 of FIG. 2 is obtained by collecting bend sensor data produced when the vehicle 10 collides with various test objects at various speeds. The test objects have different masses and different shapes such as round, flat and pointed. In general, the change in output signal level (i.e., the response) of the bend sensors 20a-20e increases with increasing object mass and impact speed, and the relationship among the sensor outputs varies with object shape. An impact is detected when the response of one or more of the bend sensors 20a-20e exceeds a threshold, and the correlation unit 32 determines the impact location according to the bend sensor segment 20a-20e having the highest response. The correlation unit 32 records the vehicle speed at the time of impact and characterizes segment-to-segment differences among the bend sensors 20a-20e. By correlating this data with the calibration data of memory 30, the correlation unit 32 additionally determines the object mass and shape data. The impact location, object mass and object shape are provided as inputs to discrimination unit 34, which determines if a pedestrian impact has occurred. In the event of a pedestrian impact, the discrimination unit 34 commands deployment of one or more PSDs 12 via line 18.

The calibration data stored in memory 30 is acquired during a series of controlled impacts at the various sensor locations along bumper fascia 24, with different test objects, and at different speeds. For each impact, two types of bend sensor data are recorded: the response of the bend sensor at the location of the impact (i.e., the on-location sensor), and normalized responses of the other bend sensors (i.e., the off-location sensors). The responses of off-location sensors are normalized by dividing them by the response of the on-location sensor. Finally, the response of the on-location sensor is recorded under the various speed and object shape constraints for objects differing in mass. For example, when a test object impacts the bumper fascia 24 at the location of bend sensor 20a, the highest response will occur at bend sensor 20a, and the other bend sensors 20b-20e will exhibit some change in output. All of the responses are recorded, and the off-location sensor responses are normalized with respect to the response of on-location sensor 20a. The normalized values are then stored for various combinations of vehicle speed and object shape. The mass of the object is then adjusted, and the response of the on-location sensor 20a for each object mass is recorded.

FIG. 3A represents the stored calibration data for impacts to bend sensor 20a in the form of a hierarchical look-up table.

Figure 3B:
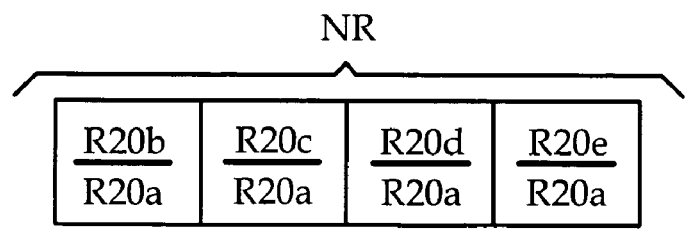
FIG. 3B is a diagram depicting a calibration data set of FIG. 3A.

Similar data structures would exist for each of the other bend sensors 20b-20e. In the representation of FIG. 3, calibration data has been recorded at each of four different impact speeds (VS1, VS2, VS3, VS4), for objects having three different shapes (Round, Flat, Pointed) and two different masses (M1, M2). Of course, the number of speed, shape and mass variations can be different than shown. Normalized responses (NR) for off-location sensors (i.e, sensors 20b-20e) are stored for each combination of impact speed and object shape. FIG. 3B depicts a representative normalized response (NR) data set; as indicated, the responses R20b, R20c, R20d, R20e of the off-location sensors 20b, 20c, 20d, 20e are each divided by the response R20a of the on-location sensor 20a. The response (R) of the on-location sensor 20a is stored for each combination of vehicle speed, object shape and object mass.

Figure 4:
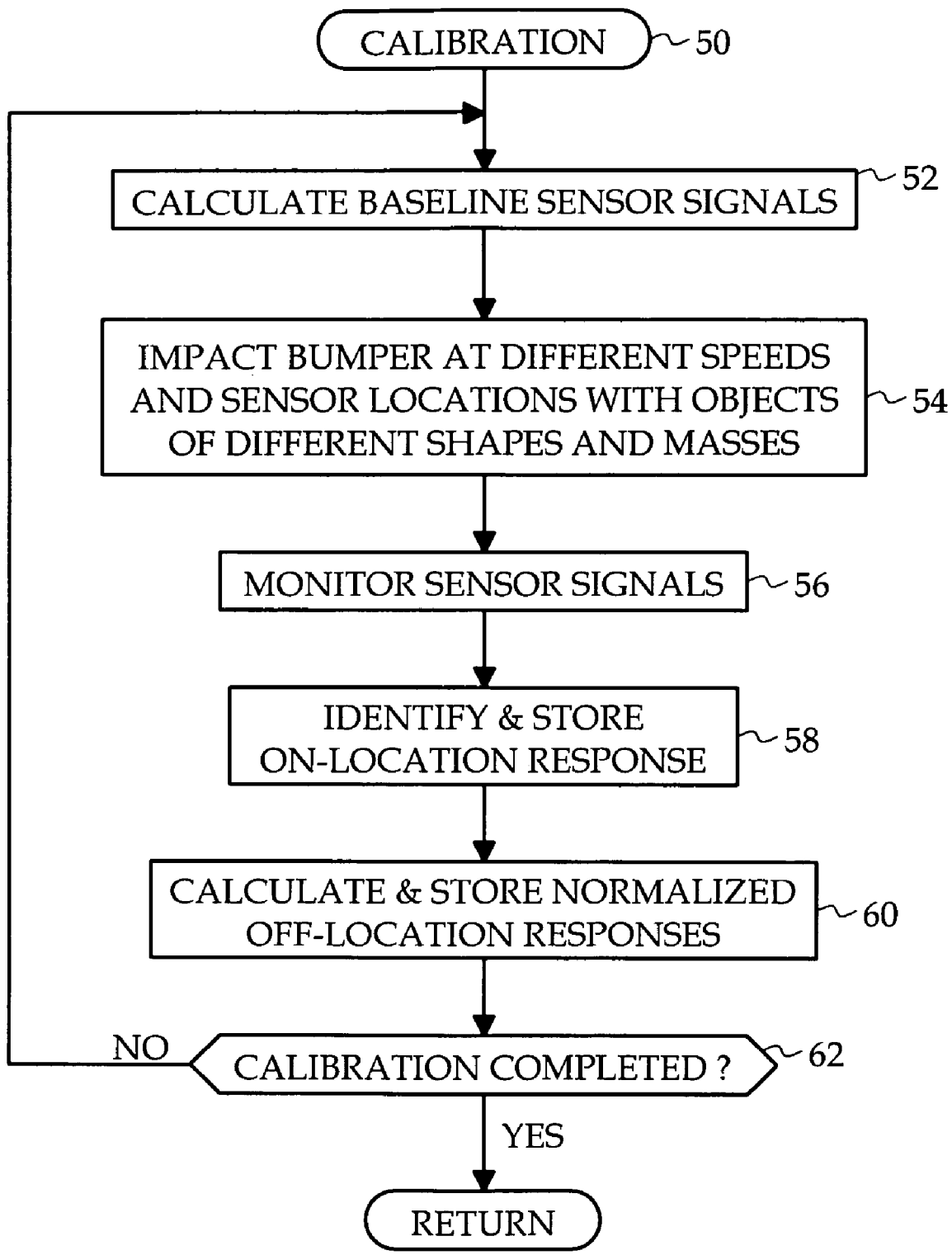
FIG. 4 is a flow diagram representative of a software routine executed by the ECU of FIG. 1 for acquiring the calibration data depicted in FIG. 3A.

The process of collecting the calibration data of FIG. 3A is summarized by the calibration routine 50 of FIG. 4. First, the block 52 records the bend sensor output signals and determines baseline signal values for each of the sensors 20a-20e, by calculating a moving average, for example. Then an object of specified shape and mass impacts a specified sensor location at a specified velocity (block 54) while the sensor signals are monitored (block 56). The block 58 identifies and stores the response (R) of the on-location bend sensor, and the block 60 calculates and stores a set of normalized responses (NR) for the off-location bend sensors. In each case, the response is the peak change in value of a sensor signal relative to the respective baseline signal value. The block 62 directs re-execution of the blocks 52-60 with respect to a different type of impact until the calibration process has been completed.

The flow diagram of FIG. 5 represents a software routine periodically executed by the correlation unit 32 of ECU 16 during operation of the vehicle 10. Initially, the block 70 is executed to determine baseline signal values for each of the sensors 20a-20e as described above in respect to block 52 of the calibration routine 50. The blocks 72 and 74 then monitor the sensor signals and compare the sensor responses to a predetermined threshold. If the threshold is not exceeded, the block 70 updates the moving averages used to establish the baseline signal values, and block 72 continues to monitor the sensor responses. When one or more sensor responses exceed the threshold, the blocks 76-92 are executed to determine and output the impact location, the object shape and the object mass. The block 76 sets the impact speed equal to the current value of vehicle speed VS. The block 78 identifies the on-location sensor as the sensor having the highest response, and the block 80 records the on-location sensor response (R). Optionally, the block 80 can also record the duration of the on-location response for correlation with corresponding calibration data. Then block 82 records a data set containing the normalized off-location sensor responses (NR).

The blocks 84 and 86 correlate the recorded sensor data with the stored calibration data to determine the object shape. Block 84 accesses all stored off-location calibration data for the sensor identified at block 78 and the impact speed recorded at block 76. Referring to the table representation of FIG. 3A, it will be assumed, for example, that sensor 20a has been identified as the on-location sensor and that the recorded impact speed is VS1; in this example, the correlation unit 32 accesses the normalized response (NR) data sets stored at 94, 96 and 98. Returning to the flow diagram of FIG. 5, the block 86 then correlates the off-location normalized responses recorded at block 82 with the accessed calibration data sets to determine the object shape. For example, if the recorded off-location normalized responses most nearly correlate with the normalized calibration responses stored at block 94 of FIG. 3A, the object shape is determined to be Round as signified by the table block 100.

Once the object shape has been determined, the blocks 88 and 90 correlate the recorded sensor data with the stored calibration data to determine the object mass. Block 88 accesses all stored on-location calibration data for the sensor identified at block 78, the impact speed recorded at block 76 and the object shape determined at block 86. Referring to the table representation of FIG. 3A, the correlation unit 32 accesses the response (R) data stored at table blocks 102 and 104 for the example given in the previous paragraph. Returning to the flow diagram of FIG. 5, the block 90 then correlates the on-location response recorded at block 80 with the accessed calibration data to determine the object mass. For example, if the recorded on-location sensor response most nearly correlates with the response stored at calibration table block 102 of FIG. 3A, the object mass is determined to be M1 as signified by the table block 106.

The routine of FIG. 5 concludes at block 92, which outputs the impact location, the object shape and the object mass to discrimination unit 34 of FIG. 2. The discrimination unit 34 uses predetermined rules to determine if the object shape and mass are representative of a pedestrian, or some other object such as a trash can or a bicycle. For example, a pedestrian impact can be detected if the object shape is round (possibly a pedestrian's leg) and the object mass is about 15 Kg. In addition to determining if the object is a pedestrian, the discrimination unit 34 can determine if and how PSD deployment should be activated based on the impact speed and impact location, for example.

In summary, the present invention provides a practical and cost-effective method and apparatus for detecting pedestrian impacts. While the invention has been described with respect to the illustrated embodiments, it is recognized that numerous modifications and variations in addition to those mentioned herein will occur to those skilled in the art. For example, the sensor response can be based on time rate of change or time at peak level, and so on. Accordingly, it is intended that the invention not be limited to the disclosed embodiment, but that it have the full scope permitted by the language of the following claims.

The invention claimed is:

1. A method of detecting an impact of a vehicle with a pedestrian, comprising the steps of:

sensing deflections of a vehicle body panel at distributed sensing locations on said body panel;

identifying peak changes in the sensed deflection at each sensing location during impacts between said body panel and test objects of diverse shape and diverse mass at different impact speeds and sensing locations;

storing the identified peak changes in sensed deflection to form a body of baseline calibration data categorized by impact location, impact speed, test object mass, and test object shape;

detecting an impact between said body panel and an unknown object when the deflection sensed at one or more of said distributed sensing locations exceeds a threshold, and designating an impact location as the sensing location with highest deflection;

determining an impact speed between said body panel and said unknown object;

retrieving baseline calibration data corresponding to the designated impact location and the determined impact speed;

correlating peak changes in the sensed deflections due to the detected impact with the retrieved baseline calibration data to determine a shape and a mass of said unknown object; and determining if said unknown object is a pedestrian based in part on the determined shape and the determined mass.

2. The method of claim 1, wherein:

the retrieved baseline calibration data includes an on-location peak deflection value for the designated impact location, and off-location peak deflection values for sensing locations away from the designated impact location; and the peak changes in the sensed deflections due to the detected impact are correlated with the on-location peak deflection value to determine the mass of the unknown object, and with the off-location peak deflection values to determine the shape of the unknown object.

3. The method of claim 1, including the steps of:

determining a speed of said vehicle when said impact is detected; and determining said impact speed according to the determined vehicle speed.

4. The method of claim 1, wherein:

said test objects of diverse shape include round test objects, flat test objects and pointed test objects.

5. Apparatus for detecting an impact of a vehicle with a pedestrian, comprising:

a set of sensor segments affixed to distributed sensing locations of a vehicle body panel to measure deflection of said body panel at said distributed sensing locations;

a memory unit for storing a body of baseline calibration data obtained from peak changes in the measured deflections during impacts between said body panel and test objects of diverse shape and diverse mass at different impact speeds and sensing locations; and processing means for identifying peak changes in the measured deflections when an unknown object is impacted by said body panel, identifying the sensing location with highest peak change in measured deflection, determining an impact speed, correlating the identified peak changes in the measured deflections with baseline calibration data corresponding to the identified sensing location and the determined impact speed to determine a shape and a mass of the unknown object, and determining if the unknown object is a pedestrian based in part on the determined shape and the determined mass.

6. The apparatus of claim 5, wherein:

said body panel is a bumper or bumper fascia of said vehicle.

7. The apparatus of claim 5, wherein:

each of said sensor segments is a bend sensor.

8. The apparatus of claim 5, where:

the baseline calibration data stored in said memory unit for a respective sensing location includes a stored on-location peak change in measured deflection for the respective sensing location, and stored off-location peak changes in measured deflection for sensing locations other than the respective sensing location; and the processing means: (a) correlates the peak change in measured deflection at the identified sensing location with the stored on-location peak change in measured deflection to determine the mass of the unknown object, and (b) correlates the peak changes in measured deflection at sensing locations other than the identified sensing location with the stored off-location peak changes in measured deflection to determine the shape of the unknown object.

9. The apparatus of claim 5, wherein:

the test objects of diverse shape include round test objects, flat test objects and pointed test objects.

* * * * *